Figure 1:
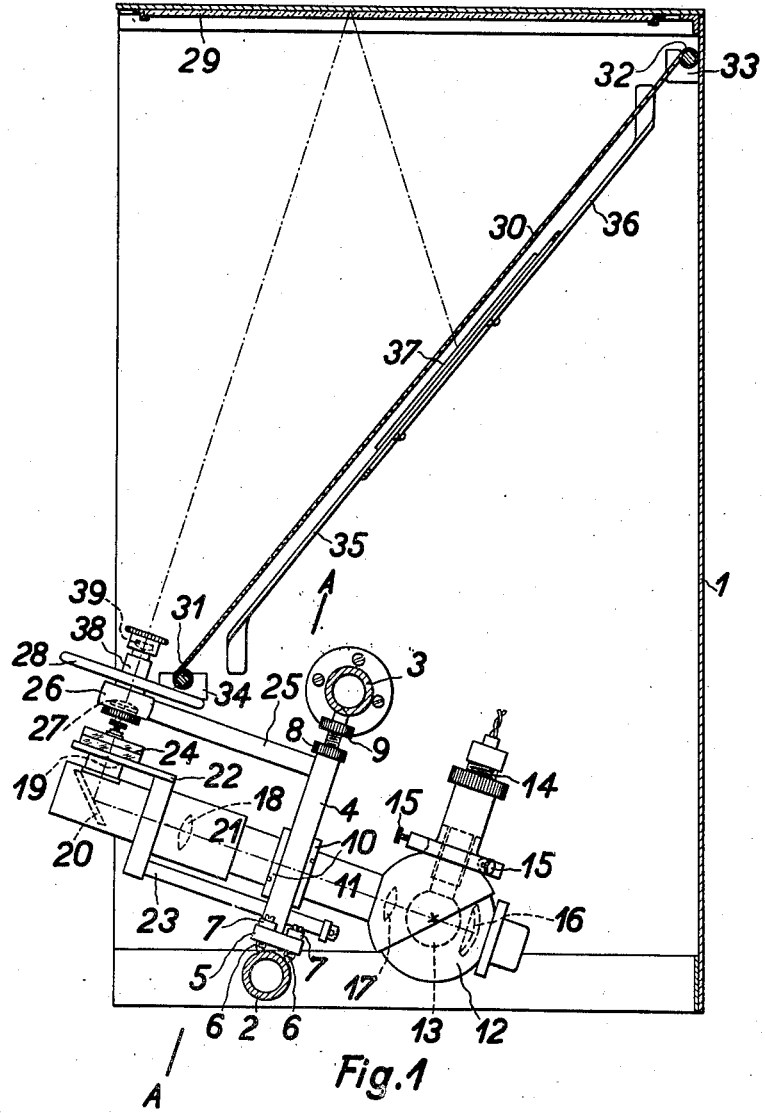

UNITED STATES PATENT OFFICE 1,964,712

INSTRUMENT FOR RAPID EXAMINATION OF TRANSPARENT MICROSCOPIC PREPARATIONS

Walther Bauersfeld, Jena, Germany, assignor to firm of Carl Zeiss, Jena, Germany Application July 16, 1932, Serial No. 622,985
In Germany July 18, 1931

3 Claims. (Cl. 88—24)

The copending application Ser. No. 596,934, filed March 5, 1932, and which has become Patent No. 1,943,508, dated Jan. 16, 1934 concerns an instrument for rapidly examining transparent microscopic preparations. This instrument has a projection apparatus in which the axis of the pencil of projection rays is slightly inclined in such a manner that it goes from below in upward direction away from the observer, a light protection housing, which contains an approximately horizontal reflector for deviating the pencil of projection rays, and a projection screen. If the light source is a glow lamp, a new lamp will be required from time to time, and if an arc-lamp is used, the consumed carbons will have to be replaced by fresh ones. The necessity of replacing the light source frequently entails variations in the illuminated field produced by the illumination device, since the incandescent filament of the glow lamp will not always assume one and the same position with respect to the lamp holder or the crater of the arc-lamp will not lie exactly at the same place relatively to the optical members of the illumination device. To obviate this inconvenience, it is advisable to provide the instrument with an appliance admitting a subsequent adjustment relative to the projection screen, the most suitable being to provide according to the invention an appliance holding the projection apparatus in such a manner that this projection apparatus may be adjusted relatively to the projection screen in the light protection housing. It has proved to be of advantage to provide the light protection housing with two transverse supports arranged approximately one above the other and supporting the said appliance at three spots in such a way that the positions of the two support spots on one of these supports is variable and the support spot on the other support is fixed. Supporting the projection apparatus in this way permits to adjust in a simple manner the middle of the illumination field to the middle of the projection screen.

If provided with a source of light which is adjustable according to its position, the instrument may be further improved by making the projection screen detachable and fixing closely behind this screen, that is to say to a support disposed in the light protection housing, another projection screen covering only the middle part of the projection field. As a rule, the projection screen receiving the projected images is to protect the observer from the heat radiated by the light source, for which reason this screen is made to cover the view of the light source. In general, only very little room will be at the disposal of the observer's hands and manipulating the adjusting screws at the light source will not be very easy. It is obvious that using for the adjustment another, smaller, projection screen is of some advantage. This adjustment may be specially simplified by equipping the instrument with an additional optical system and disposing this system in the path of the projection rays, behind the projection objective. When in position for use, this additional system images on the projection screen the aperture of the projection objective and, together with this aperture, the light source itself, the light source also being imaged in the objective by the condenser system generally used. Strictly speaking, the optical members must be given such distances apart that the condenser images the incandescent filament of the glow lamp, or the crater of the arc-lamp, in the entrance pupil of the projection objective, and that the exit pupil of this objective is imaged by the additional optical system on the projection screen, the projection objective imaging in the exit pupil the light-source image lying in its entrance pupil. In most cases it will be sufficient to observe these distances at least approximately.

Figure 2:
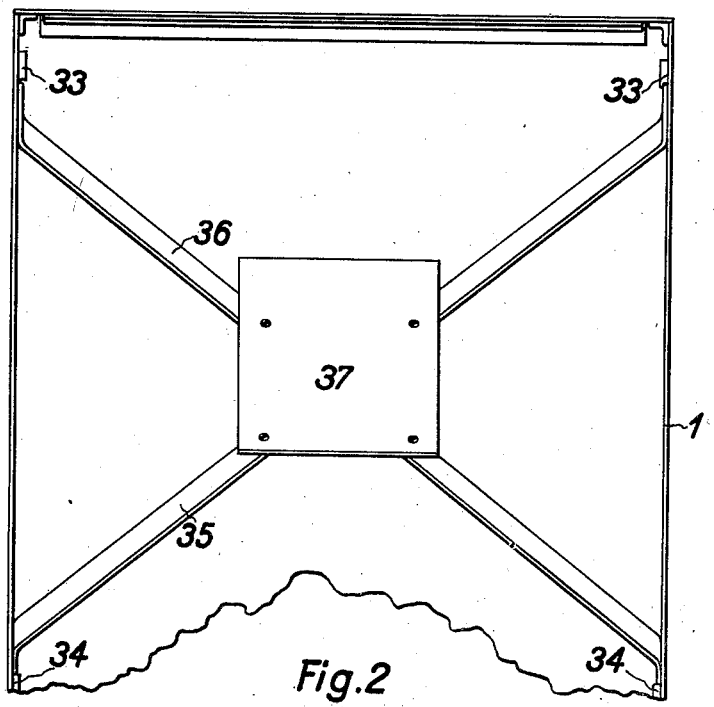
Figure 3:
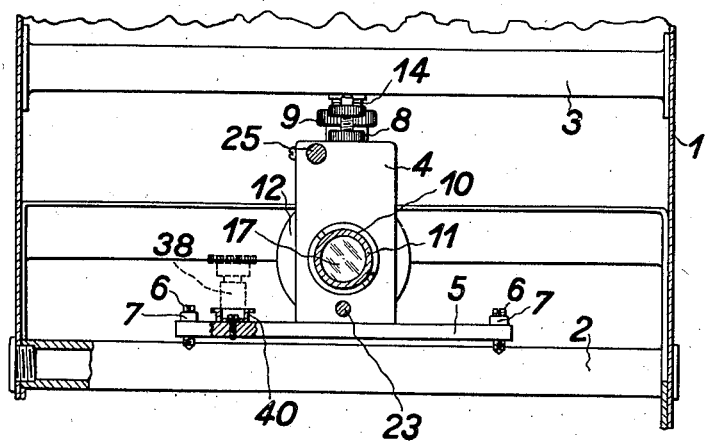

The accompanying drawings, which illustrate the invention, represent the constructional example of a projection apparatus. Figure 1 shows the apparatus is a lateral section, Figure 2 is a partial view of the device in front elevation and Figure 3 represents a partial section through the line A—A in Figure 1.

In a light protection housing 1 which is open towards the observer and has the form of a parallelipiped, two transverse rods 2 and 3 are fixed in such a manner that the upper rod 3 is slightly displaced towards behind with respect to the lower rod 2. Between these two rods 2 and 3 the projection apparatus proper is adjustably mounted by means of a plate 4 connected to a base plate 5. Each of the two ends of the base plate 5 is provided with two pointed screws 6 which are held in position by lock nuts 7. The upper part of the plate 4 is held by a pointed screw 9 resting in a recess in the wall of the upper rod 3, this screw 9 having a milled head and a lock nut 8. The plate 4 holds the tube 11 containing the illumination device of the projection apparatus. This tube 11 is secured to the plate 4 by means of two threaded rings 10, the axis of the illumination device being inclined towards behind by an angle corresponding to the positions of the rods 2 and 3. At the rear end of the tube 11 is provided a spherical lamp case 12 containing a glow lamp 13 which may be adjusted up and downwardly by means of a thread 14 and at right angles to this direction by means of set screws 15. The lamp case 12 also contains a concave mirror 16, which represents a reflector for the glow lamp 13, and a condenser lens 17. In that part of the tube 11 which is in front of the plate 4 are provided condenser lenses 18 and 19. A mirror 20 disposed between these two lenses serves for deviating the pencil of illumination rays at a right angle towards above. On the said part of the tube 11 is displaceable a sleeve 21 which supports the object stage 22, a guide rod 23 in the plate 4 preventing the said sleeve from being rotated. The object slides are a compressorium 24. The upper part of the plate 4 is provided with a bracket 25 holding the mount 26 of a projection objective 27. This mount 26 has a stopping down screen 28.

To the upper wall of the light protection housing 1 is fixed a plane mirror 29 which directs the imaging rays to a projection screen 30. This projection screen 30 is held by means of two rods 31 and 32, which rest in supports 33 and 34 fixed to the side walls of the light protection housing 1, and protects the observer from the heat radiated by the source of light. Immediately behind the projection screen 30, the two side walls of the light protection housing are connected by transverse rods 35 and 36. The said two rods, which lie in a plane parallel to that of the screen 30, hold a projection screen 37 corresponding to the middle part of the projection field. The instrument is completed by an adjusting tube 38 containing a converging system 39. When not in use, the adjusting tube 38 is held by a sleeve 40 fixed to the base plate 5.

When in use, the projection apparatus is placed in the light protection housing 1 by making the screws 6 rest on the rod 2, and the screw 9 in the recess in the wall of the rod 3. With a view to facilitate the adjustment, the projection screen 30 is removed by lifting the rods 31 and 32 from the supports 33 and 34. By adjusting the screws 15 and the thread 14 the glow lamp 13 is given such a position that the incandescent filament is approximately in the centre of the lamp case 12. The concave mirror 16 is to be so adjusted that the incandescent filament is imaged approximately in itself. The condenser lenses 17, 18 and 19 as well as the mirror 20 image the incandescent filament approximately in the entrance pupil of the projection objective 27. The imaging rays traverse the preparation disposed between the object slides of the compressorium 24. Now the objective 27 is so adjusted that this preparation is sharply imaged on the projection screen 37 by way of the mirror 29.

The adjustment proper of the instrument is effected as follows. By means of the screws 6 and the thread 9, the projection apparatus is given a position in which the middle of the projection field lies approximately in the middle of the projection screen 37. This being the case, the nuts 7 and 8 are screwed up so as to prevent the possibility of displacing the projection apparatus relatively to the light protection housing 1 and, consequently, with respect to the projection screen 37. The adjusting tube 38 is inserted in the objective mount 26. The converging system 39 is so constructed that it images the exit pupil of the objective 27 approximately on the screen 37 and makes the image of the edge of the objective 27 appear approximately sharply. By adjusting the converging system 39 in the tube 38, the image of the edge of the objective is given the correct position. An image of the incandescent filament of the glow lamp 13 being in the exit pupil of the objective 27, also this filament is reproduced on the screen 37. This last said image of the incandescent filament serves for the exact adjustment of the glow lamp 13, the screws 15 and the thread 14 having to be manipulated until there appears on the screen 37, and in the image of the objective edge, a filament image covering the image of the objective edge as much as possible. By suitably adjusting the glow map 13 relatively to the concave mirror 16, it is attained that a filament image projected by this mirror 16 lies next to the incandescent filament itself, which means that the surface acting as a light source is suitably enlarged. If now the image of the edge of the objective appearing on the screen 37 is sufficiently illuminated by the image of the incandescent filament, the lock nut on the thread 14 is screwed up, the tube 38 placed in the sleeve 40, and the projection screen 30 given its position for use in the light protection housing 1. All this having been effected, the instrument is ready for use.

I claim:

1. An instrument for rapid examination of transparent microscopic preparations, containing a light source, a projection objective, the axis of the projection objective being directed upwardly away from the observer, a support for the preparations to be examined, this support being disposed between the light source and the projection objective, a horizontal reflector provided above the projection objective, a projection screen the projection surface of which is approximately parallel to the rear exterior rays of the projection ray pencil striking the reflector, a light protection device containing the aforesaid parts, two transverse rods disposed in the light protection device, below the projection screen, these rods being provided approximately above each other, and means for adjusting the said projection objective relatively to the said transverse rods, the said means being supported at three spots by the said transverse rods.

2. An instrument for rapid examination of transparent microscopic preparations, containing a light source, a projection objective, the axis of the projection objective being directed upwardly away from the observer, a support for the preparations to be examined, this support being disposed between the light source and the projection objective, a horizontal reflector provided above the projection objective, a projection screen detachably fitted to the instrument the projection surface of which is approximately parallel to the rear exterior rays of the projection ray pencil striking the reflector, and another projection screen parallel to and disposed immediately behind the first said screen and covering only the middle part of this screen.

3. In an instrument according to claim 2, a condenser system disposed between the light source and the projection objective so as to image the light source approximately at the locus of the projection objective, and an additional optical system detachably inserted behind the projection objective in the path of the rays so as to image the projection objective on the projection screen.

WALTHER BAUERSFELD.